US 6,757,452 B2

(12) United States Patent
Shin et al.

(10) Patent No.: US 6,757,452 B2
(45) Date of Patent: Jun. 29, 2004

(54) INTEGRATED HEAT TRANSFER DEVICE FOR PLC MODULE

(75) Inventors: Sang-Gil Shin, Suwon-shi (KR); Seung-Wan Lee, Suwon-shi (KR); Oh-Dal Kwon, Suwon-shi (KR); Sun-Tae Jung, Anyang-shi (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 302 days.

(21) Appl. No.: 09/974,630

(22) Filed: Oct. 10, 2001

(65) Prior Publication Data
US 2003/0016900 A1 Jan. 23, 2003

(30) Foreign Application Priority Data
Jul. 21, 2001 (KR) .......................... 2001-43977

(51) Int. Cl.$^7$ ............................. G02B 6/12; G02B 6/34
(52) U.S. Cl. ..................... 385/14; 385/40; 385/37; 385/129; 385/130
(58) Field of Search ............................. 385/14, 28, 37, 385/40, 129–132

(56) References Cited

U.S. PATENT DOCUMENTS

| 5,016,958 | A |   | 5/1991 | Booth ..................... 350/96.13 |
| 5,919,383 | A | * | 7/1999 | Beguin et al. .............. 219/209 |
| 6,246,809 | B1 | * | 6/2001 | Jouanno et al. ................ 385/22 |
| 6,327,397 | B1 | * | 12/2001 | Schiaffino et al. ............ 385/16 |
| 6,498,878 | B1 | * | 12/2002 | Ueda ........................... 385/37 |

FOREIGN PATENT DOCUMENTS

| EP | 0603411 B1 | 8/1998 | ........... C12M/1/38 |
| EP | 1099965 A2 | 5/2001 | ........... G02B/6/28 |
| JP | 58-115424 | 7/1983 | ........... G02F/1/29 |
| JP | 04-204523 | 7/1992 | ........... G02F/1/295 |
| JP | 06-295779 | 10/1994 | ........... H05B/3/20 |
| JP | 09-006170 | 1/1997 | .......... G03G/15/20 |
| JP | 10-123340 | 5/1998 | ........... G02B/6/122 |
| JP | 10-332971 | 12/1998 | ........... G02B/6/13 |
| JP | 11-014844 | 1/1999 | ........... G02B/6/122 |
| JP | 11-055015 | 2/1999 | ........... H01Q/1/02 |
| JP | 2000-131539 | 5/2000 | ........... G02B/6/12 |
| JP | 2001-1033643 | * 2/2001 | |
| JP | 2001-083343 | * 3/2001 | |
| JP | 2001-083344 | 3/2001 | ........... G02B/6/12 |
| JP | 2001-14210 | 5/2001 | ........... G02B/26/08 |

* cited by examiner

Primary Examiner—Hemang Sanghavi
(74) Attorney, Agent, or Firm—Cha & Reiter, L.L.C.

(57) ABSTRACT

There is provided a PLC module formed by depositing the core as an optical signal transmission medium and the clad surrounding the core on a semiconductor substrate, wherein a heating line is attached to the lower surface of the PLC and generates heat to the PLC from externally received power. An insulation layer is coated on the lower surface of the PLC with the heating line fixed thereto. Therefore, the direct attachment of the heating line to the lower surface of the PLC minimizes heat loss.

10 Claims, 3 Drawing Sheets

FIG. 1 [PRIOR ART]

INTEGRATED HEAT TRANSFER DEVICE FOR PLC MODULE

CLAIM OF PRIORITY

This application makes reference to and claims all benefits accruing under 35 U.S.C. Section 119 from an application entitled, "Integrated Heat Transfer Device for PLC Module," filed in the Korean Industrial Property Office on Jul. 21, 2001, and there duly assigned Serial No. 2001-43977.

BACKGROUND OF THE INVENTION

1. Field of the Invention

The present invention generally relates to a PLC (Planar Light-wave Circuit) module, and in particular, to a PLC module with a heat transfer device that is capable of maintaining the temperature distribution of a PLC uniform, while increasing the heat efficiency therein.

2. Description of the Related Art

A slight variation in the temperature of the PLC changes the refractive index within a light waveguide, thus changing the wavelength characteristics and the optical power of the PLC. Thus, a uniform temperature distribution across the PLC is essential in the field of optical communications. To this end, the overall temperature of the PLC is maintained uniformly by transferring the heat to the PLC. Accordingly, an efficient heat transfer mechanism is important from a heat source to a PLC. A known apparatus in this art is a planar WDM (Wavelength Division Multiplexing) device with a phase array configuration that is capable of utilizing light interference between the light waveguides with different light paths. This type of planar WDM device is typically packaged with a thermal management system, such as Peltier devices. However, the thermal management system used in the prior art has some drawbacks in that it is highly costly and consumes a lot of power to operate as it requires heat exchange with its surroundings.

To address the prior art problem, an improved thermal management system for a PLC module 10 is provided as shown in FIG. 1. The PLC module 10 is assembled as a single optical device that is capable of transferring the heat to the PLC module. The PLC module 10 is comprised of a PLC 11, a heat transfer plate 12 attached under the PLC 11, a heat sensor (not shown) between the PLC 11 and the heat transfer plate 12, and a heat emitting plate 13 under the heat transfer plate 12.

The PLC 11 is designed to divide the intensity of an optical signal according to the shape of a core, which is formed by depositing a plurality of silica or thin polymer films on a silicon or quartz substrate. As readily apparent to those skilled in the art, the signal intensity is produced based on the difference between the refractive indexes of a core and a clad surrounding the core.

The heat emitting plate 13 is provided with a heating line 14 formed by a strand of resistance wire that is bent in a zigzag shape. Both ends of the heating line 14 are connected to the external electric lines 18 to generate heat for the PLC 11.

The PLC module 10, as described in the preceding paragraphs, transfers heat generated from the heating line 14 to the PLC 11 through the heat transfer plate 12. Meanwhile, the temperature of the heat transfer plate 12 is monitored and controlled via the heat sensor.

However, in the course of transferring heat from the heat emitting plate 13 to the PLC 11, the heat transfer plate 12 experiences heat loss, thereby decreasing the heat efficiency and making the temperature distribution of the PLC 11 non-uniform. As a result, the PLC 11 undergoes changes in its characteristic wavelength and causes loss in its optical power. Moreover, as the heat is transferred through the heat transfer plate 12, the time required for the PLC module 10 to reach the normal operation temperature is undesirably long.

SUMMARY OF THE INVENTION

The present invention is directed to provide a PLC module in which the heat generated from a heat source is transferred to a PLC efficiently in order to maintain uniformity in the temperature distribution of the PLC.

According to an aspect of the invention, the inventive PLC module is capable of reaching the normal operation temperature much more quickly than the prior art module.

According to another aspect of the invention, a heating line is directly attached to the lower surface of a PLC by a silk printing process, and an insulation layer is coated on the lower surface of the PLC with the heating line fixed thereto. In addition, pads are attached to both ends of the heating line to connect the heating line to an electric line.

According to another aspect of the invention, a method of making a semiconductor device is provided. The method includes the steps of: providing a planar lightwave circuit (PLC); adhering a heat line to the lower surface of the PLC; providing an insulation layer attached to the lower surface of the PLC containing the heat line; and, coupling an external power source coupled to the heating line for generating heat thereto. The heat line is adhered to the lower surface of the PLC by a silk printing process.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
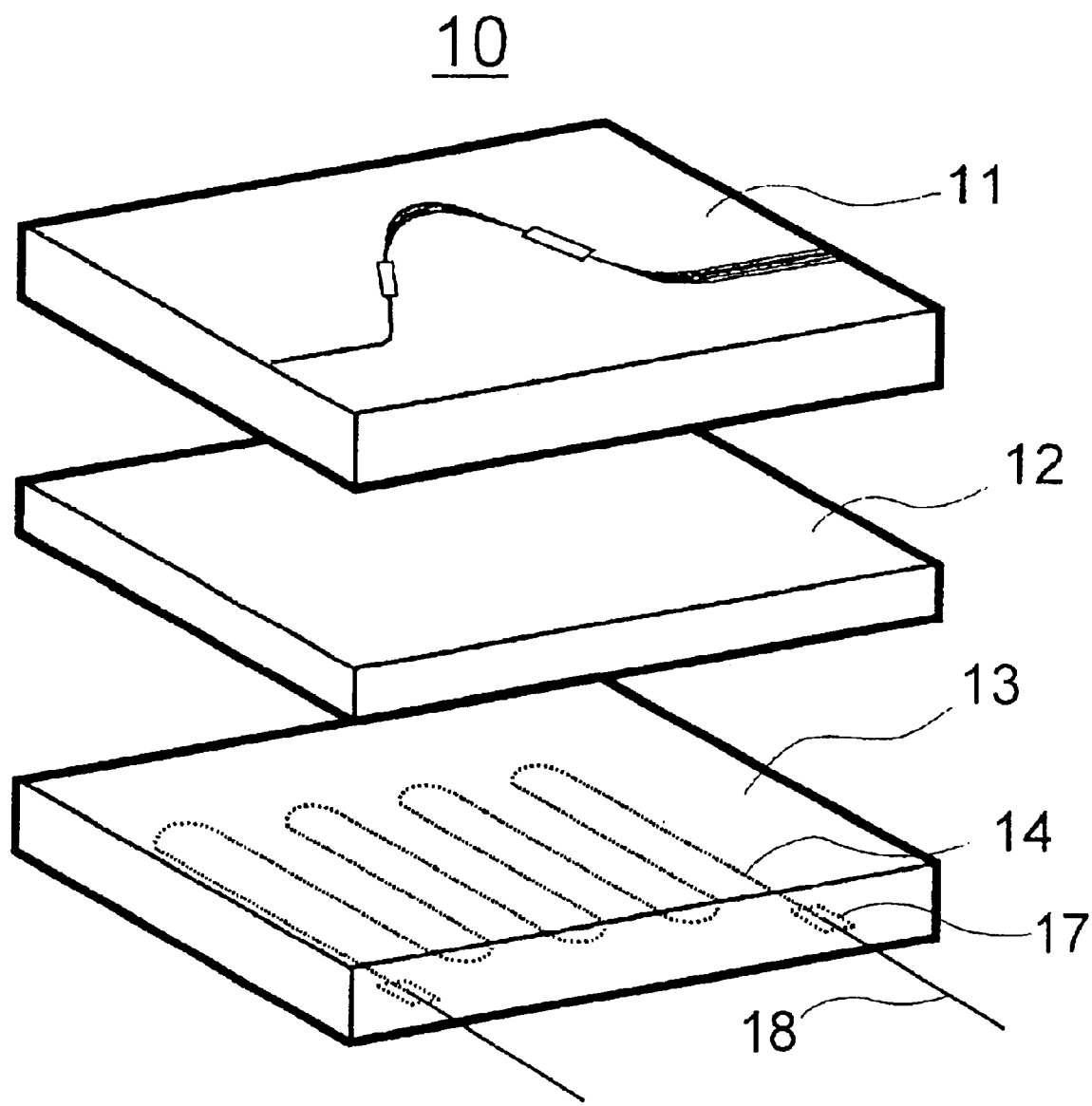
FIG. 1 illustrates a heat transfer mechanism for a conventional PLC module.
Figure 2:
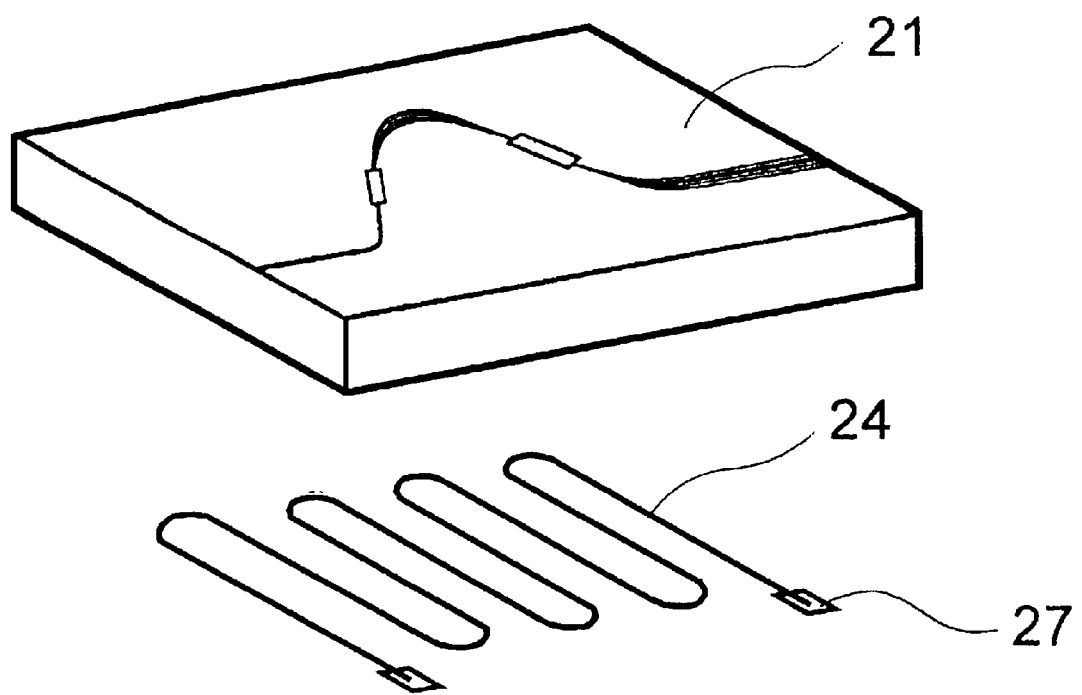
FIG. 2 illustrates a portion of the PLC module with a heat transfer mechanism according to a preferred embodiment of the present invention; and, FIG. 3 is a partial cutout view of the PLC module with the heat transfer mechanism according to the preferred embodiment of the present invention.
Figure 3:
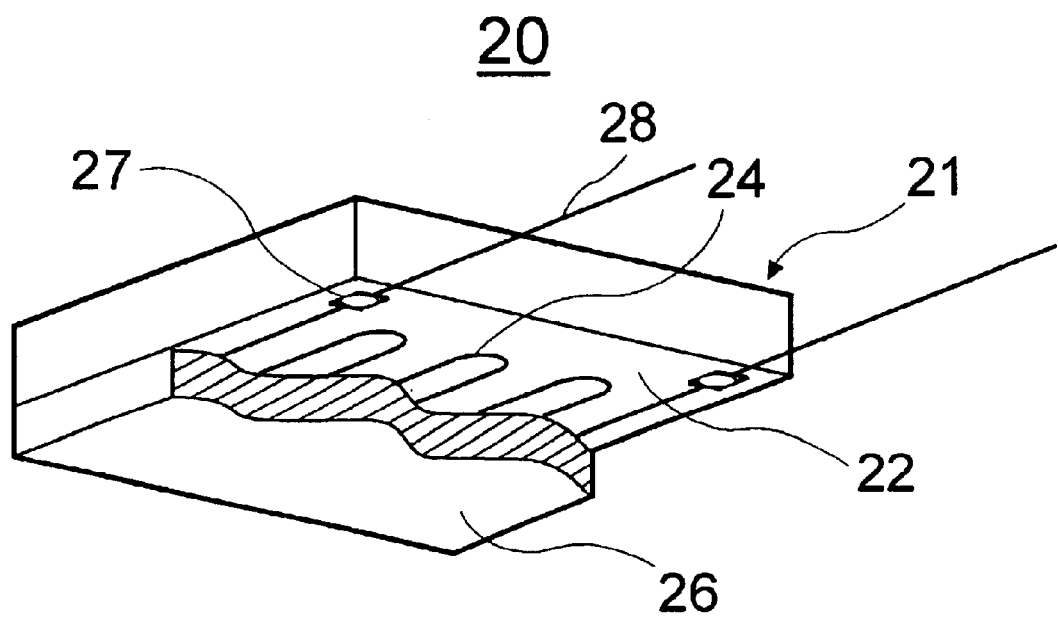

FIG. 2 illustrates a side view of the PLC module with a heat transfer mechanism according to a preferred embodiment of the present invention. FIG. 3 is a partial cutout view of the PLC module with an insulation layer coated on the lower surface of a PLC according to the preferred embodiment of the present invention.

Referring to FIGS. 2 and 3, a PLC module 20 according to the present invention includes a PLC 21, a heating line 24 attached to the lower surface of the PLC 21, and an insulation layer 26 coated on the lower surface of the PLC 21 with the heating line 24 attached thereto.

The PLC 21 is designed to divide the intensity of an optical signal according to the shape of a core, which is formed by depositing a plurality of silica or polymer thin films on a silicon or quartz substrate, based on the difference between the refractive indexes of the core and a clad surrounding the core.

The heating line 24 is a thin film bent in zigzag shape attached to the lower surface 22 of the PLC 21 through a silk printing process. Both ends of the heating line 24 are connected to electric lines 28 via soldering pads 27 for receiving the power supply. Upon receipt of external power, the heating line 24 transfers heat to the PLC 21, thereby maintaining the uniformity of the temperature distribution and the refractive index of the PLC 21.

The insulation layer 26 is formed by coating a heat insulation material on the lower surface 22 of the PLC 21 with the heating line 24 fixed thereto in order to prevent damage to the heating line 24, thus increasing the durability of the heating line 24.

The inventive PLC module 20 may further include a heat sensor and a thermal management circuit (not shown) at predetermined positions of the PLC 21 to provide the heat uniformly via a feed-control operation. The PLC module 20 is housed in a housing (not shown) to exert a predetermined performance against the external environmental changes or shocks.

In operation, when a predetermined power voltage is supplied to the heating line 24, the heating line 24 emits heat and transfers the heat to the PLC 21. To obtain a uniform temperature distribution, the heating line 24 should be arranged uniformly and closely on the lower surface 22 of the PLC 21.

The heating line 24 serves to enable uniformity of the temperature of the PLC 21, and the insulation layer 26 increases heat efficiency and protects the heating line, thereby increasing the durability of the PLC module 20. In addition, the temperature of the PLC 21 can be controlled by reading it through the heat sensor and adjusting power supplied to the heating line 24 accordingly.

In accordance with the present invention, a heating line is directly attached to the PLC 21 to prevent heat loss in the course of heat transfer through a heat transfer plate as in the prior art system. Therefore, the heat efficiency of a PLC is increased, and deteriorating performance that is caused by the non-uniform temperature distribution of the prior art PLC is removed. In addition, the stability of the PLC is enhanced through the stable temperature control, and the PLC reaches a normal operation state from an initial operation point in much quicker time as the heat is transferred without loss associated with the heat transfer plate. Furthermore, the process of attaching a heat transfer plate to the heat emitting plate including a heating line using the heat grease is not necessary. Thus, the process of manufacturing the inventive PLC 21 is simple and the size of the PLC module can be reduced.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An integrated heat transfer device comprising:

a planar lightwave circuit (PLC);

a heating line attached to the lower surface of said PLC; and, an external power source coupled to said heating line for generating heat thereto such that uniformity of the temperature distribution and the refracttive index of the PLC is maintained.

2. The integrated heat transfer device of claim 1, wherein said heating line is a thin film attached to the lower surface of said PLC via a silk printing process.

3. The integrated heat transfer device of claim 1, further comprising an insulation layer attached to the lower surface of the PLC having said heating line fixed thereto.

4. The integrated heat transfer device of claim 1, wherein at least one pad is attached to at least one end of said heating line to electrically connect said heating line to said external power source.

5. A method for making a semiconductor device, the method comprising the steps of:

providing a planar lightwave circuit (PLC);

adhering a heat line to the lower surface of said PLC;

providing an insulation layer attached to the lower surface of said PLC containing said heat line; and, coupling an external power source coupled to said heating line for generating heat thereto such that uniformity of the temperature distribution and the refracttive index of the PLC is maintained.

6. The method of claim 5, wherein adhering said heat line to the lower surface of said PLC being performed by silk printing.

7. The method of claim 5, wherein at least one pad is attached to at least one end of said heating line to electrically connect said heating line to said external power source.

8. An integrated heat transfer device comprising:

a planar lightwave circuit (PLC);

a heating line attached to the lower surface of said PLC;

an insulation layer attached to the lower surface of the PLC containing said heating line; and, an external power source coupled to said heating line for generating heat thereto such that uniformity of the temperature distribution and the refracttive index of the PLC is maintained.

9. The integrated heat transfer device of claim 8, wherein said heating line is a thin film attached to the lower surface of said PLC via a silk printing process.

10. The integrated heat transfer device of claim 8, wherein at least one pad is attached to at least one end of said heating line to electrically connect said heating line to said external power source.

* * * * *